(12) United States Patent
Jayaweera

(10) Patent No.: US 7,801,962 B2
(45) Date of Patent: Sep. 21, 2010

(54) EMAIL COLLABORATION MANAGER

(76) Inventor: Surya Jayaweera, 112 Harvard Ave., #296, Claremont, CA (US) 91711

( * ) Notice: Subject to any disclaimer, the term of this patent is extended or adjusted under 35 U.S.C. 154(b) by 995 days.

(21) Appl. No.: 11/336,197

(22) Filed: Jan. 20, 2006

(65) Prior Publication Data

US 2007/0174394 A1 Jul. 26, 2007

(51) Int. Cl.
*G06F 15/16* (2006.01)
*G06F 15/173* (2006.01)
(52) U.S. Cl. .................. 709/207; 709/206; 709/224
(58) Field of Classification Search .......... 709/206, 709/223–224, 207
See application file for complete search history.

(56) References Cited

U.S. PATENT DOCUMENTS

| | | | |
|---|---|---|---|
| 6,101,531 A * | 8/2000 | Eggleston et al. ........ 709/206 |
| 6,249,807 B1 * | 6/2001 | Shaw et al. .............. 709/206 |
| 6,282,565 B1 * | 8/2001 | Shaw et al. .............. 709/206 |
| 6,839,741 B1 * | 1/2005 | Tsai ....................... 709/217 |
| 6,941,304 B2 * | 9/2005 | Gainey et al. ............. 707/10 |
| 7,409,425 B2 * | 8/2008 | Naick et al. .............. 709/206 |

* cited by examiner

*Primary Examiner*—Hussein A Elchanti
(74) *Attorney, Agent, or Firm*—Julio M. Loza; Loza & Loza, LLP

(57) ABSTRACT

A collaboration management system and method is provided for logging, monitoring, alerting, and striping attachments from communications to and from a client/contact into a single record. The collaboration management system receives electronic messages from the one or more devices, strips a first electronic message of a header and content, and stores the content in a record associated with an electronic address in the first electronic message. Additionally, any attachment is stripped from the first electronic message, stored separately from the content, and associated with the record. A single copy of an attachment is maintained and linked to one or more records. A list of users of that should be notified of changes to the record is maintained and a notification is sent to users of a change in the record if the user is in a notification list associated with the record.

22 Claims, 8 Drawing Sheets

| Synopsis for Client A | Field | Attachments Links |
|---|---|---|
| Contact C [Last Note/Email Subject Line or Content] | Date & Time | [File Name V] |
| Contact E [Last Note/Email Subject Line or Content] | Date & Time | None |
| Contact J [Last Note/Email Subject Line or Content] | Date & Time | [File Name Y] |
| My Contacts All Contacts | | |

EMAIL COLLABORATION MANAGER

FIELD

The present invention generally relates to information collaboration and management systems and more particularly, to a system and method for monitoring and logging email communications and automatically notifying interested parties.

BACKGROUND

In companies or organizations, different internal parties often communicate with the same client(s). However, communications with the client or information about the client is not easily shared or available to all internal parties that interact with the client. The lack of access to such prior communications and client information often leads to inefficiencies and lower quality of client services. Furthermore, parties that have access to the information must often sift through numerous unorganized emails, attachments, and written notes to attempt to ascertain what has been communicated previously to the client.

Information about a client is often replicated in multiple locations on the company's computer infrastructure (e.g., multiple copies of the same emails and/or attachments saved by server) taking up valuable storage space and consuming corporate resources. Moreover, if a client communicates with just one party in a company, other company personnel that may benefit from access to the client information are not notified that a communication has taken place. This may lead to a break down in internal communications, business inefficiencies and miscommunications when dealing with the client. Therefore, there is a need for a method and/or system that efficiently stores, maintains, and shares client information with interested parties.

SUMMARY

One aspect of the present invention provides a collaboration manager application and/or device that facilitate the accessibility, storage, and distribution of emailed information so that incoming and outgoing communications with contacts and/or clients are accessible to a plurality of interested parties. The collaboration manager permits multiple parties within a company access to emails, notes, and/or attachments related to a particular contact and/or client. The collaboration manager may have an access control feature that restricts access to certain client/contact records or information (or parts of client records) based on an access privilege level granted to a user. The collaboration manager provides several novel features, including a) email logging, b) attachment stripping, and c) email monitoring and alerting.

One implementation of the invention provides a method, apparatus, and system for sharing of electronic mail and notes among a plurality of selected users. Email users can copy or forward emails to a unique email address that is associated with a collaboration manager. The collaboration manager is able to determine the sender and/or recipient(s) of the email and archive the email according to an associated contact or client record.

When an electronic message intended for a particular contact/client is received, it is stripped and a stripped version of the electronic message is stored in a record associated with the contact or client. Attachments from the electronic message are stripped, associated with the contact or client record, and separately stored in a database. The amount or level of storage may be defined by the sending user via flags or a uniquely identifiable email address that is associated with an storage level.

The system further monitors the intended recipient or sender of received electronic messages, determines if the intended recipient has an existing contact/client record, and retrieves the existing record to append the stripped version of the electronic message to the existing record. If no contact or client record exists for the identified recipient or sender, the system creates a new record and adds the stripped version of the electronic message to the existing record. The system may also check the record database for duplicate attachments and store attachments only if a duplicate is not found. Electronic messages intended for different clients are logged in different records associated with each of the intended clients.

User access to the contact/client records may be restricted by use of access privileges defining what information from the contact/client record can be accessed.

Electronic messages intended for different contacts/clients are logged in different records associated with each of the intended contact or clients. Each client record may include one or more contact records. Also a contact or client record may include user-entered notes associated with the contact or client.

A monitoring application monitors for changes in contact or client records and alerts one or more users if a change to a record occurs. A monitor alert list associated with the contact or client record defines the users that should be notified. A user may reply to a notification to log a comment about a client or contact. Additionally, a user may also upload a file attachment into a client record via email without sending the email to any other recipients.

DETAILED DESCRIPTION

Figure 1:
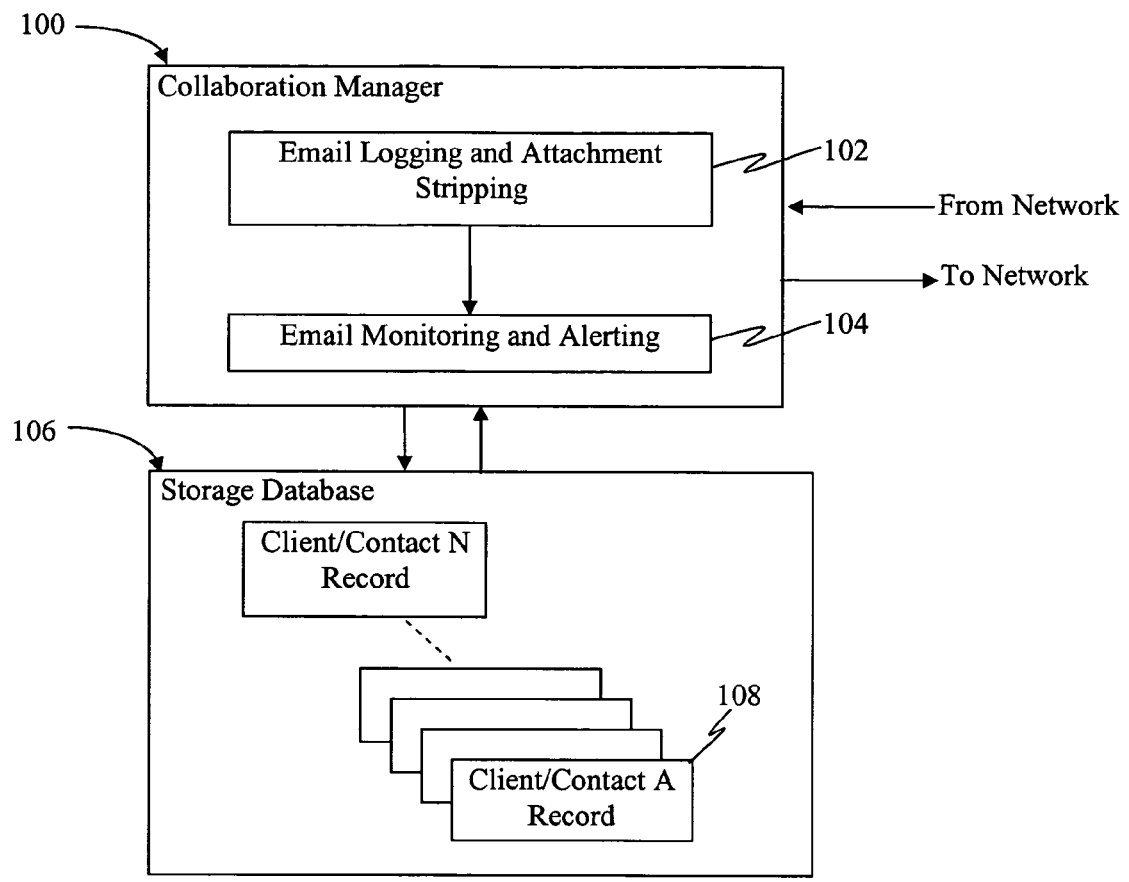
FIG. 1 is a block diagram illustrating a collaboration management system according to one implementation of the invention.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure where the element first appears. The following description is provided to enable any person skilled in the art to make and use the invention and sets forth the best modes contemplated by the inventor, but does not limit the variations available. As used in this disclosure, except where the context requires otherwise, the term "comprise" and variations of the term, such as "comprising", "comprises" and "comprised" are not intended to exclude other additives, components, integers or steps.

In the following description, certain terminology is used to describe certain features of one or more embodiments of the invention. The term "email" refers to electronic mail and other types of electronic messaging used to transfer information over a network or communication link. The terms "client" and "contact" refer to any individual, business entity, and/or party that can be identified by an email address, name, domain name, or other unique identifier. The term "attachment" refers to any electronic file or object including e-mails, manuals, manuscripts, web pages, word processing documents, spreadsheets, presentations, movies, pictures and Adobe® PDF documents. The term "storage device" refers to any device capable of storing information, including dynamic random access memory (DRAM). The term "data element" refers to any quantum of data packaged as a single item. The term "data unit" refers to a collection of data elements. The term "storage database" includes any mechanism that provides (i.e., stores and/or transmits) information in a form readable by a machine (e.g., a computer). The term "machine-readable medium" includes read-only memory (ROM), random access memory (RAM), magnetic disk storage media, optical storage media, flash memory devices, electrical/optical/acoustical or other form of propagated signals (e.g., carrier waves, infrared signals, digital signals, etc.), etc.

One aspect of the present invention provides a collaboration manager application and/or device that facilitate the accessibility, storage, and distribution of emailed information so that incoming and outgoing communications with contacts and/or clients are accessible to a plurality of interested parties. The collaboration manager permits multiple parties within a company access to emails, notes, and/or attachments related to a particular contact and/or client. The collaboration manager may have an access control feature that restricts access to certain client/contact records or information (or parts of client records) based on an access privilege level granted to a user. The collaboration manager provides several novel features, including (a) email logging, (b) attachment stripping, (c) email monitoring and alerting and/or (d) project/time tracking.

FIG. 1 is a block diagram illustrating a collaboration management system according to one embodiment of the invention. A collaboration manager 100 stores and retrieves information from a storage database 106. The collaboration manager 100 may be operational on a computer or server communicatively coupled to a private and/or public network to receive communications, such as emails, containing contact or client-related information.

According to one feature of the invention, the collaboration manager 100 is configured to receive emails sent to or received from a particular electronic address and log the email information 102 according to the intended recipient and/or sender. Upon receipt of an email, the collaboration manager 100 checks the intended recipient(s) or sender (e.g., contact client email address) and logs or stores the email information under a client record 108 in the storage database 106. For example, an email software application (e.g., Microsoft® Outlook®, etc.) may be configured to, either manually or automatically, copy sent and/or received emails to a collaboration manager 100. The collaboration manager 100 may reside on a separate computing device than the email software application. For example, the collaboration manager 100 may operate on a centralized server that is communicatively coupled to the devices on which user email applications operate (e.g., through a public or private network, direct or indirect link, wireless connection, etc.). The devices on which an email application may operate include both wired and wireless devices including, but not limited to, computers, pagers, cellular phones, wireless personal digital assistants (PDAs), or any other device capable of receiving and/or sending an electronic message.

Figure 2:
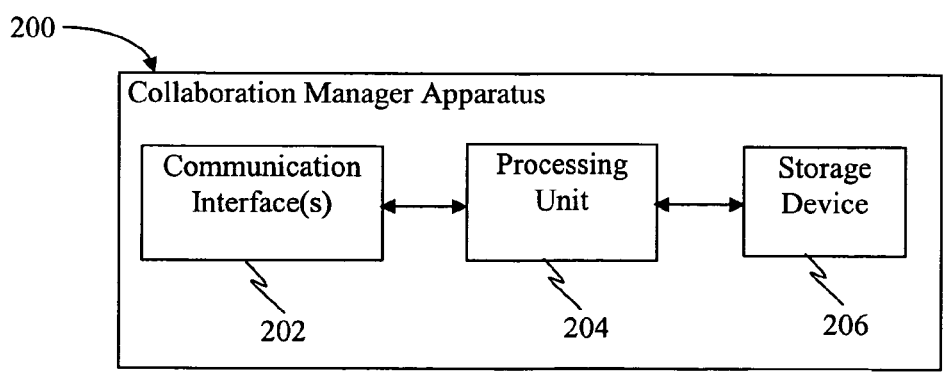
FIG. 2 is a block diagram illustrating components of an apparatus on which the collaboration manager may operate.

FIG. 2 is a block diagram illustrating components of an apparatus on which the collaboration manager may operate. The apparatus 200 includes one or more communication interfaces 202 that can communicate with other systems, via a network or other link, operating email applications. A processing unit 204 is coupled to the communication interfaces 202 and a storage device 206 and is configured to operate a collaboration manager application having one or more features described herein. The storage device 206 may serve to store information, and/or a database of collaboration manager client records.

One or more of the components and functions illustrated in FIG. 2 may be rearranged and/or combined into a single component or embodied in several components without departing from the invention. Additional elements or components may also be added without departing from the invention.

Generally, emails may be logged by the collaboration manager 102 when a user sends an email to an email address associated with the collaboration manager 102. For example, a user may send an email to the email "xyzlog@abc.com" to log the email in the collaboration manager. A user may select the level of storage desired by using different email addresses, parameters, or flags to log emails. For example, a user may send emails to "xyzlog@abc.com" to log the header information (e.g., date, time, sender, recipient, etc.) and the subject line, or a user may send emails to "xyzlog@abc.com" to archive or log the whole email, including contents, attachments, etc. A default email or setting may save or log all contents and/or attachments along with the header information. This enables users to log emails according to a level of privacy or disclosure desired. Once received by the collaboration manager, the emails are logged in a contact and/or client record (in storage database 106) associated with a particular email address in the email (e.g., the collaboration manager email address to which the email was sent).

Figures 3, 4:
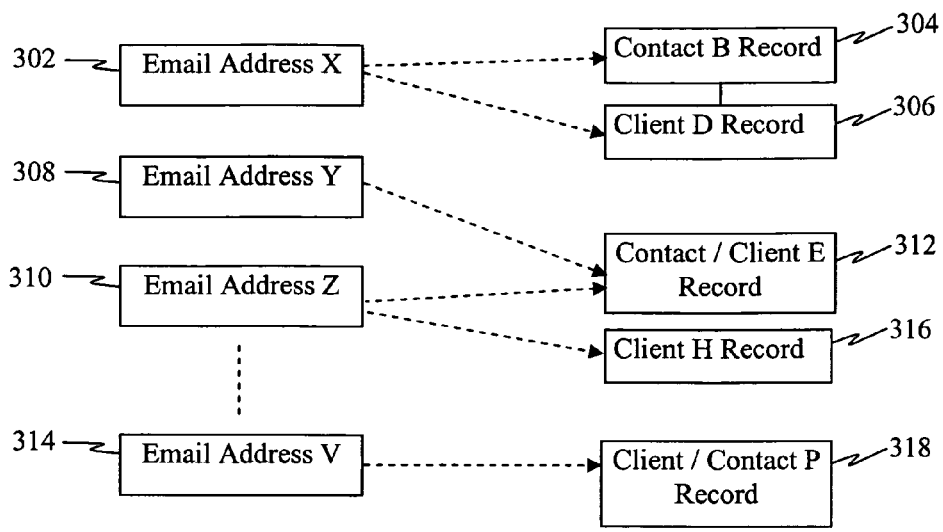
FIG. 3 is a block diagram illustrating several ways in which an email address may be associated with a client or contact record according to some embodiments of the invention.
FIG. 4 is an exemplary user interface to access client or contact records according to one implementation of the invention.

FIG. 3 is a block diagram illustrating several ways in which an email address may be associated with a client or contact record according to some embodiments of the invention. Storage of the information received in an email is based on the contact(s) and/or client(s) to which the email address is associated. For example, an email address 302 may be received by a logging application and associated with both a contact record 304 and a client record 306. The email address X 302 may be associated with a particular contact person (having Contact B Record 304) who may be an employee of, or is otherwise related to, a particular client (having Client D Record 306). In this manner, emails or notes related to a particular contact person may be associated with both the contact record 304 and the client record 306. Additionally, the contact record 304 may be linked or associated with the client record 306.

Another feature provides for multiple email addresses to be associated with a single client. For example, a plurality of email addresses 308 and 310 may be associated with just a single contact or client record 312. This enables logging emails from multiple parties (e.g., employees, etc.) associated with a particular client. Moreover, in some instances, one or more email addresses 310 may be associated with a two client records 312 and 316. This may be the case, for instance, where the client records 312 and 316 correspond to related companies.

In some instances, an email address 314 may be associated with either a contact record or client record 318, but not both.

Another feature enables users to log notes into contact and/or client records maintained by the collaboration manager. The user may send an email to a particular email address associated with a contact or client to log a note about the contact or client. This effectively makes the email application the interface to the collaboration manager. Such notes may not be part of an email to other recipients. For instance, a user may enter comments into a received email and forward it to the collaboration manager for archival or logging. In another example, the user may create a new email message that is only sent to the collaboration manager. Alternatively, a user may access the collaboration manager through an interface (e.g., web-base interface) and enter a note into a contact and/or client record. All such notes may be logged and viewed along with other emails stored in the client record.

Referring again to FIG. 1, another feature of the collaboration manager 100 provides email monitoring and alerting 104 to users. This feature monitors when emails from or to particular contacts or clients are received by the collaboration manager and informs/notifies one or more predetermined users that new information about the particular contact or client is available. A monitor alert list of interested parties may be maintained for each contact and/or client. The users in the monitor alert list for a particular contact and/or client may have an interest in knowing about communications to and/or from that contact or client and may have different levels of access privileges to the contact or client information. In various implementations, the email monitor and alert manager 104 may send a user email a copy of each log related to particular contact or client of interest, or the user may receive a periodic email (e.g., daily, weekly, etc.) of logs related to the particular contact or interest, or the user may receive a link to new logs. In some implementations, a user may add him/herself to an alert list for a particular contact and/or client while in others, the user would add to such list only after approval by an authorized party. Additionally, each user may specify what types of logs they wish to be notified about. For example, users may elect to receive alerts for changes in client/contact information, exchanged emails, and/or manually entered notes about a contact or client.

FIG. 4 is an exemplary user interface to view client or contact records according to one implementation of the invention. This user interface 400 may provide a user with a synopsis of information about new logs for a particular client or contact. For example, a user may view a list of contacts 402, 404 and 406 and the last email or note for each. The synopsis for each contact 402, 404, and 406 may show the subject line of the email/note and/or part of the body of the email/note. Additionally, for each contact entry 402, 404, and 406, other information, such as the date and time, etc., for the latest email or note as well as links to any associated attachments may be provided. This interface 400 enables a user to more easily view recent notes and emails associated with a particular client.

Moreover, a user of the collaboration manager application may be assigned access privileges on a per-client or per-contact basis. For example, a user may be prevented from accessing particular client or contact records or parts of records (e.g., access to email logs allowed from access to email content or attachments is prohibited.). Additionally, a user may view records associated with "All Contacts" for a client or just contacts of interest ("My Contacts").

Figure 5:
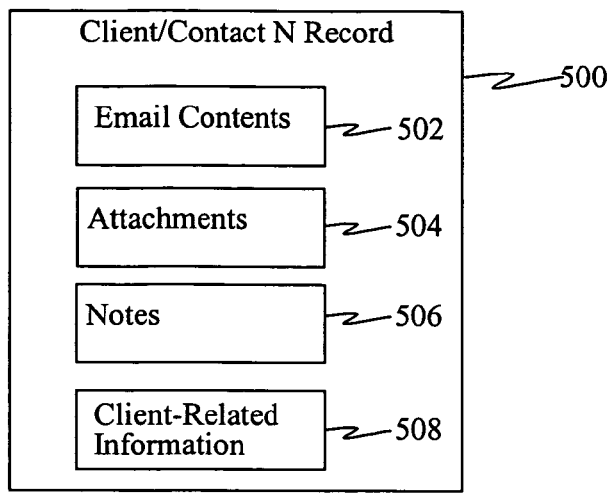
FIG. 5 illustrates a client or contact record having separately arranged email contents, attachments, notes about the client/contact, and other client-related or contact-related information.

FIG. 5 illustrates a client or contact record having separately arranged email contents, attachments, notes about the client/contact, and other client-related or contact-related information. Emails typically include headers, content, and attachments. To more efficiently log emails sent to and/or received from contacts and/or clients, the collaboration manager 100 (FIG. 1) strips the email header, email content, and any attachment from the original email and stores them as separate data items. For example, a client record 500 may separately store email contents 502, attachments 504, notes about the client 506, and other client-related information 508. In one implementation, a client record 500 is associated with a particular client. Emails identified or associated with a particular client (e.g., emails to and/or from contacts associated with the particular client) are stored or logged in the same client record 108/500. The client record 108/500 may have a unique identifier associated with the client whose contents is stored therein. A similar storage record may be used to log emails and/or notes to/from contacts.

Figure 6:
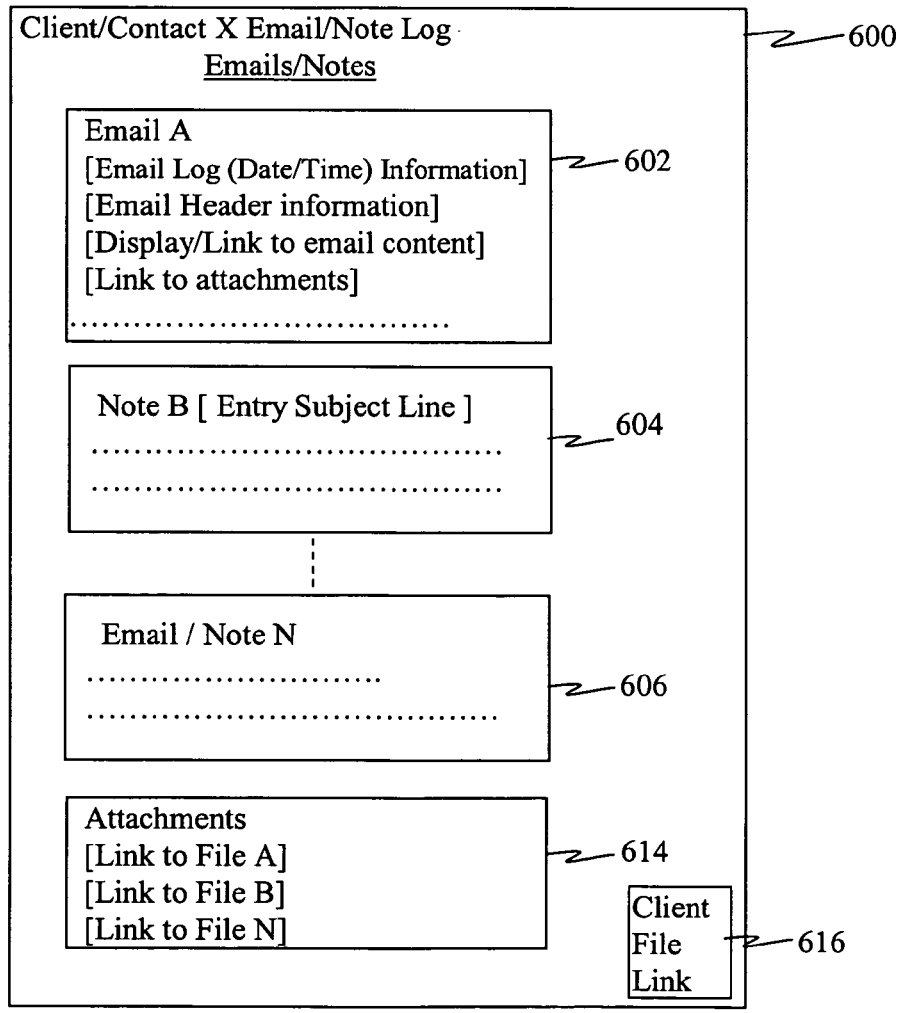
FIG. 6 illustrates an exemplary view of a collaboration manager window showing how logged emails and/or notes may be presented to users.

FIG. 6 illustrates an exemplary view of a collaboration manager window 600 showing how contact and/or client logged emails or notes may be presented to users. In this example, emails are stripped of their content and log information (e.g., subject line, sender, recipient, date, time, etc.) is displayed to the user as distinct entries 602, 604 and 606. The client record may log the emails or notes in sequential order (e.g., by date sent/received). The header information may provide sufficient information for a user to determine if a particular email or note is of interest. If it is of interest, the user can select a link to review the content of the particular email or note 602, 604, or 606.

In one example, an entry 602 corresponding to an email received by the collaboration manager includes email log information (e.g., date, time, sender, intended recipient, etc.), header information (e.g., subject line), a link to email content, and/or a link to file attachments.

In another example, a user may enter a note (e.g., comments, remarks, reply to an email, a summary of a client conversation or meeting, etc.) into a contact or client record. Such note 604 may include a subject line that permits a user to identify the nature of the note.

If the viewing user has the necessary access privilege, he/she may access the content of an email 602 or note 604 by selecting it. Alternatively, part or all of the email content may be displayed. Otherwise, some users can be prevented from viewing all or some of the email entries 602 or notes 604.

In various embodiments, the user may elect to view only email logs, note logs, or a combination of both email and note logs.

Attachments associated with a particular contact or client may be shown as links in a separate section 614 from which they can be selected for viewing. Moreover, one or more links 616 to other information in a client record may also be provided.

Figure 7:
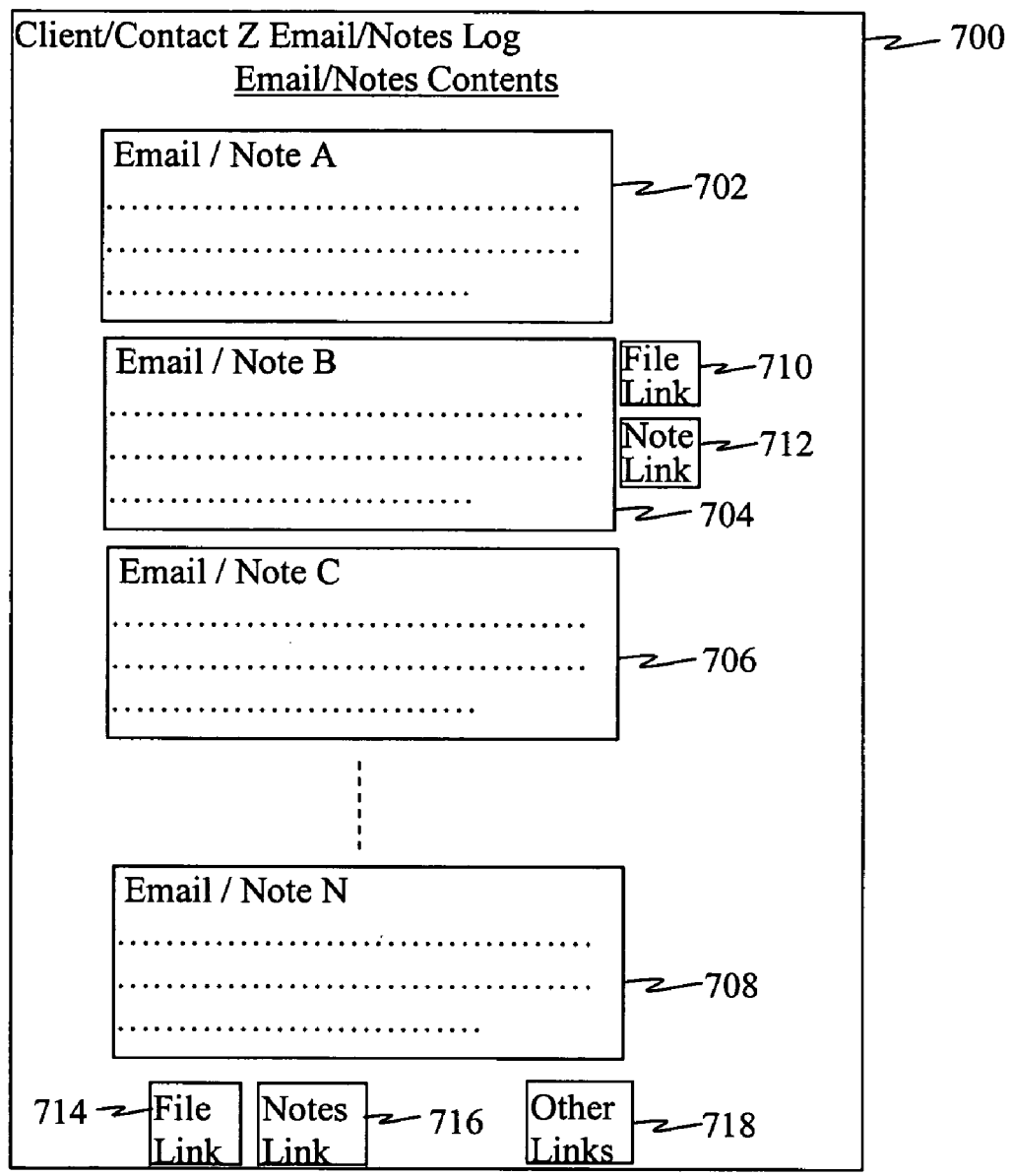
FIG. 7 illustrates another exemplary view of a collaboration manager window showing how logged emails and/or notes may be presented to users.

FIG. 7 illustrates another exemplary view of a collaboration manager window showing how logged emails and/or notes may be presented to users. One aspect of the invention provides that the text content of emails associated with a particular contact or client may be stripped from the email, collated, and stored in a client record. The contact or client record may store the email text in sequential order (e.g., by date sent/received). The user interface 700 exemplifies how logged emails and/or notes may be shown in adjacent collated regions 702, 704, 706, and 708 or on a single region for access and/or reading by a user. For instance, a first email text 702 may be logged with text from previous email communications 704, 706, and 708 to/from a particular client.

According to one feature, the collaboration manager may remove history information from emails (e.g., text from previous emails) so that just new email content is logged, thereby saving storage space. For example, a reply email to a sender of the original email with the same attachment may contain a link to the previously stored content. This avoids having to store the same information multiple times. The collaboration manager may strip history information from emails by scanning for markers in the email or by comparing the content of an email to content already stored in a client record. In other implementations, all email text may be stored without removing history information.

One feature of the invention provides for attachment stripping of emails. That is, when an email is received by the collaboration manager, it strips or removes attachments (e.g., electronic files, graphics, audio, video, etc.) from the email and stores them separately. For example, a client or contact record 700 (FIG. 7) may include a separate attachment section or link to store or reference stored attachments (e.g. Electronic files). The collaboration manager may link or associate an attachment to the email text with which it was received. In one implementation, the logging server may check the storage database 110 for a duplicate of the attachment. If no duplicate attachment is found, the attachment is saved in the storage database 110 and a link to the attachment is saved with the email contents in the client record for later retrieval. If a duplicate attachment is found in the storage database 110, a link to the existing attachment is saved with the email contents in the client record and the duplicate attachment is deleted. This feature reduces number of copies of an attachment that are saved. For example, if records for multiple clients receive the same attachment, then the collaboration manager references just one attachment from each of the client records.

When an attachment is associated with a particular email, a link 710 may appear adjacent to the associated email text 704. In some implementations, one or more links 714 to attachments for a client may appear on the user interface 700. Additionally, links 718 to other client related items may also be displayed. For example, information about the client can be obtained from electronic sources, such as, for example, maps and directions to a client location, Securities and Exchange Commission filings, or business news can be retrieved, stored, and/or associated with the client record.

The email logging and attachment stripping functions save valuable corporate storage resource space since it reduces the amount of duplicate information stored and also facilitates access to client information.

Figure 8:
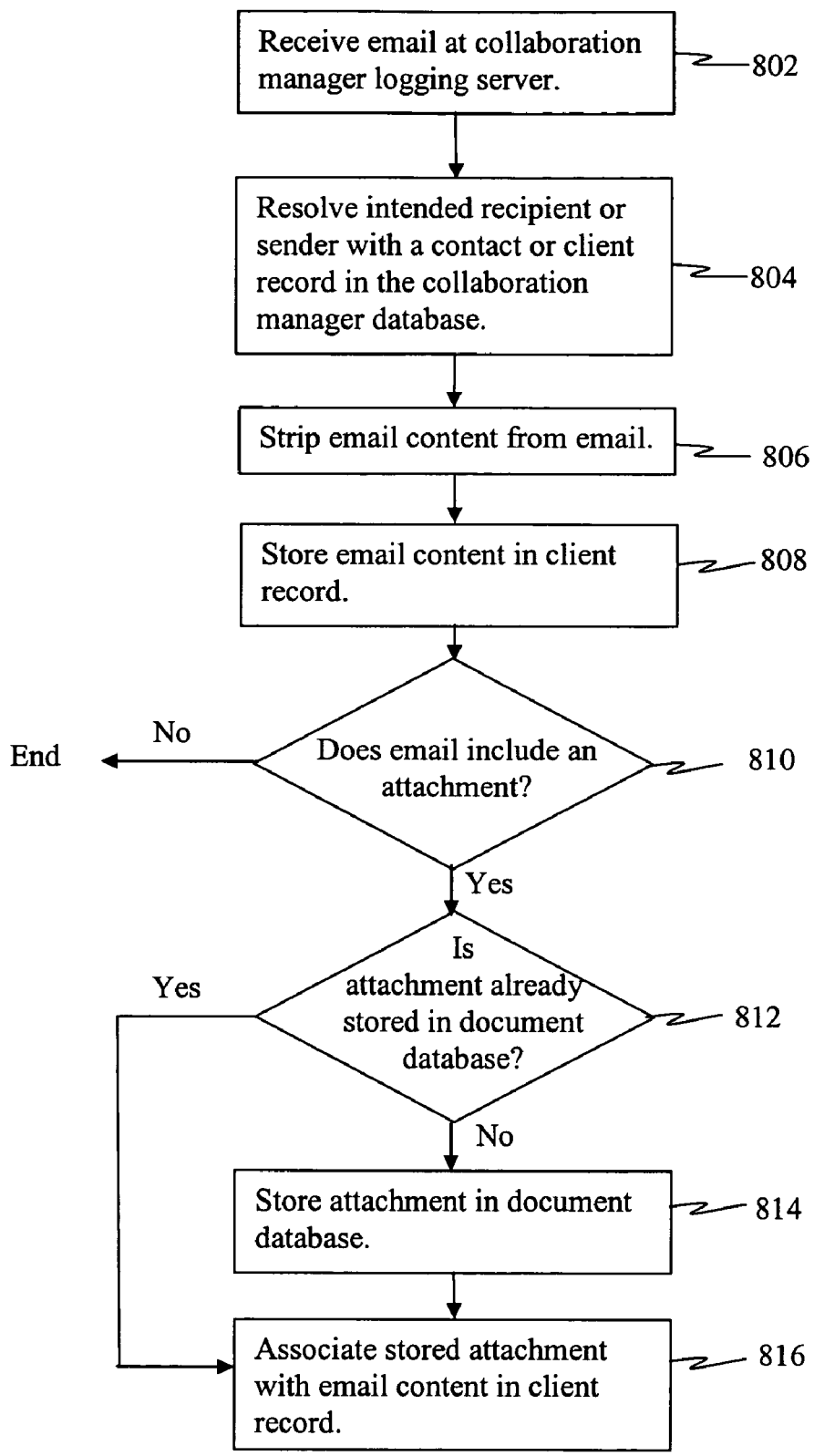
FIG. 8 illustrates a method for logging and stripping emails according to one implementation of the invention.

FIG. 8 illustrates a method for logging and stripping emails according to one implementation. In some implementations, this method may be operational on a computer, a processing unit, and/or in software. The collaboration manager server receives an email 802. This may be accomplished, for example, by the sender copying (e.g., sending) the email to the collaboration manager or by a receiving or sending email application automatically sending selected email or all mails to the collaboration manager. For example, user email applications may be configured to automatically forward emails (e.g., all emails or emails to certain recipients) to an electronic address associated with the collaboration manager. The collaboration manager then resolves the intended recipient or sender 804 email address with a contact or client record in the collaboration manager database. Note that the email (e.g., through the collaboration manager email address) may specify a particular contact or client.

The email content (e.g., text) is then stripped from email 806 and stored in the client record 808. In one embodiment, the stripped email content may be collated with other email content in the client record by date or other order. If the email includes an attachment(s) (e.g., files, etc.) 810, then the collaboration manager determines whether the attachment is already stored in the document database 812. An attachment is checked against other attachments in the client record and/or document database for duplicates, thereby maintaining only one copy of the attachment. If the attachment is already stored in the document database, then that stored document is associated with the email content in the client record 814. If the attachment is not stored in the document database, then it is stored in the document database 816 and is associated with the email content in the client record 818.

Figure 9:
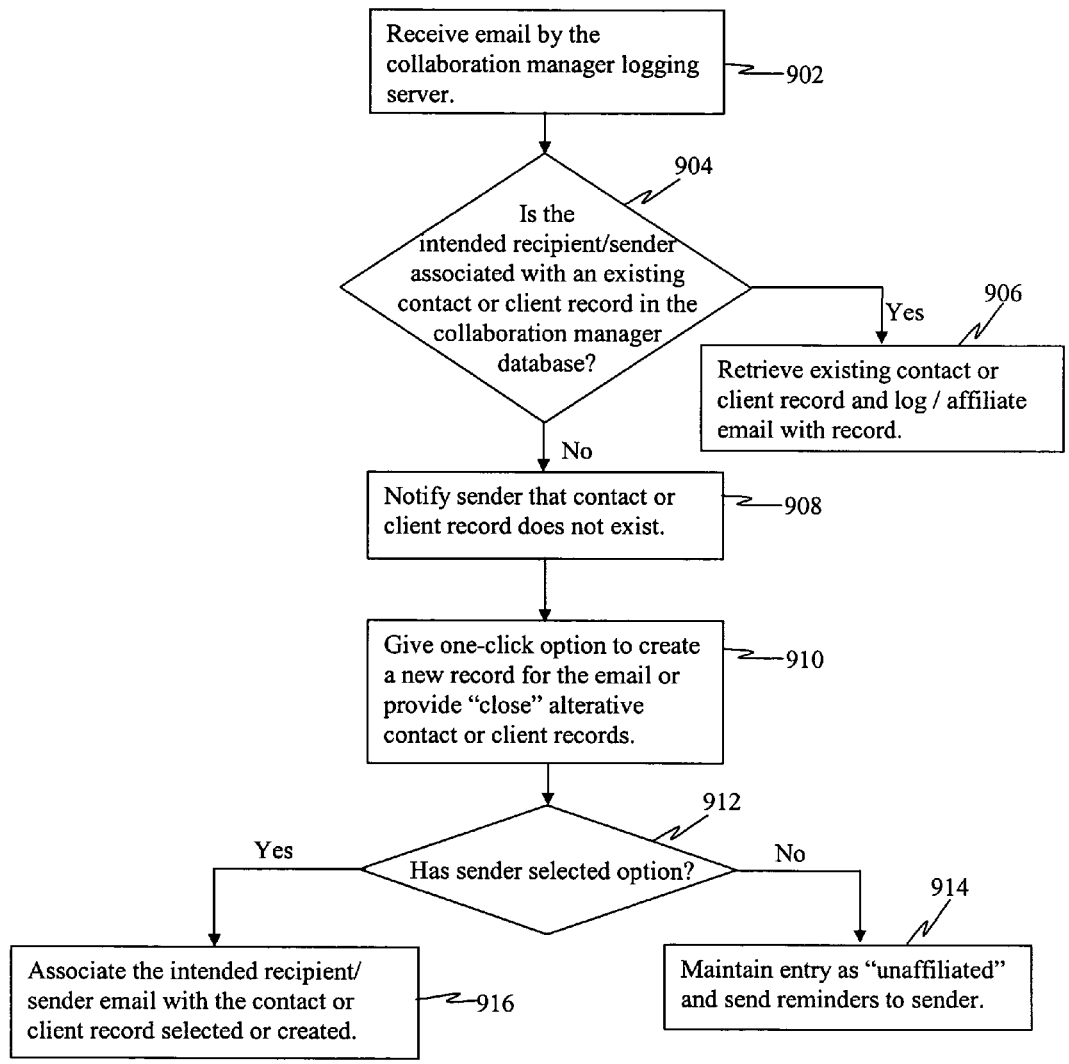
FIG. 9 illustrates a method for reconciling an intended recipient or sender with a contact or client record in the collaboration manager database according to one feature of the invention.

FIG. 9 illustrates a method for reconciling an intended recipient or sender with a contact or client record in the collaboration manager database according to one feature of the invention. This process may be used to ascertain to which client or contact record an email should be logged. An email is received at the collaboration manager logging server 902. The system determines if the intended recipient or sender is associated with an existing contact or client record in the collaboration manager database 904. If a match is found between the sender or recipient and a contact or client record, then the record is retrieved and the email is logged or affiliated with the record 906. Otherwise, the sender of the email is notified that a contact or client record does not exist 908. In such notification, the sender of the email may be given one-click options to create a new client or contact record to log the email or existing alternative contact or client records that may be close 910. Additionally, the sender may also use an application interface (e.g., web-based interface) to create a new client or contact record, delete the email log request, or associated the email log with an existing client or contact record. The collaboration manager then logs the email into an "unaffiliated" record and sends reminders to the sender 914 until the sender has selected an option for storing the record 912. Once the sender selects such option, the collaboration manager associates the email with the selected or newly added record 916. Additionally, the collaboration manager may keep track of all unaffiliated email logs and their intended recipient or sender. When a record is created for such intended recipient or sender email addresses (even if it is created by a third party) the collaboration manager may automatically log the email under that client or contact record.

Figure 10:
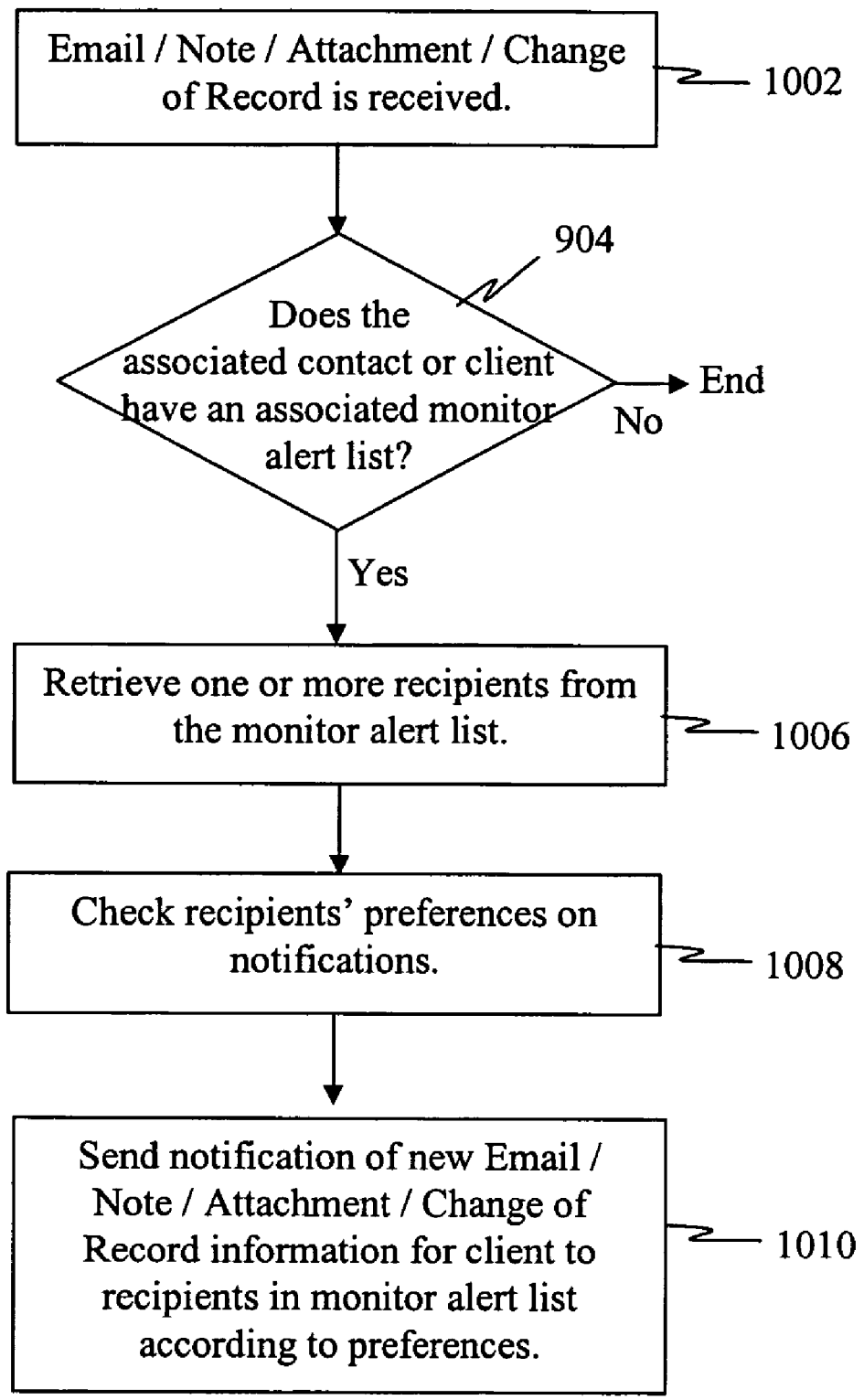
FIG. 10 illustrates a method for performing a monitoring and alerting feature of a collaboration manager according to one embodiment of the invention.

FIG. 10 illustrates a method for performing a monitoring and alerting feature of a collaboration manager according to one embodiment of the invention. An email, note, attachment, and/or change or record is received by the collaboration manager 1002. A check is performed to determine if the contact or client has an associated monitor alert list with one or more recipients 1004. A monitor alert list specifies one or more recipients having privileges to access the client's records or be notified of changes to a client's records. If the client has an associated monitor alert list, one or more recipients are retrieved 1006. A check for the notification preference of each recipient is performed 1008. For instance, some recipients may elect to receive notifications of certain changes, e.g., new emails or notes, but not other changes, e.g., new attachments. Additionally, the system may determine the level of access/privileges that a particular recipient may have to the client or contact record in order to restrict the notifications accordingly. A notification of the new email, note, attachment, and/or change of record is sent to recipients in the recipient list 1010. Note that the notifications may be sent to one or more recipients according to the recipients' delivery preferences (e.g., one notification with all alerts per day, a notification for each alert, etc.).

The methods and steps described in FIGS. 8, 9 and 10 may be performed in series, in parallel, or in any other order as known to those with skill in the art.

According to one feature of the invention, users may access client information (e.g., records) on the collaboration manager. A client record access window, similar to that illustrated in FIGS. 6 and 7, may permit a user to access client records over a network. A user may search for and/or access client records based on an email address or other information. Access controls may be implemented by the collaboration manager to determine if the user has the proper security to see the information. In one embodiment, authorized users may be limited to what information is available for them to access. A user may only access information that is appropriate to their access level. For example, an administrative assistant may be able to view the e-mail text and the notes of but may not have access to the attachments, whereas the president of the company can access all information in the entire client record. In another embodiment, the logging server can limit the user to viewing clients in a specific geographical location such as a sales territory.

Another feature permits a user to enter or add notes to a client record. The user can add notes to the client record. For example, a user may add a note with a synopsis of a telephone conversation between the user and the client, or other information that is not emailed or automatically entered into the system. The collaboration manager may provide a utility by which a user can enter notes or modify client records. For instance, the notes may be entered by sending an email to the collaboration manager to an appropriate email address or by setting particular flags. The notes may be logged with the author, date, time and other information for accurate tracking. Other information, such as maps and directions to a client's address can also be added to the client record.

Client records may sorted by date and/or organizational regions (geographical areas). In one implementation, the client record is displayed in a single, sortable output for a user. Such output is comprised of the information in the client record that the particular user has been authorized access.

Figure 11:
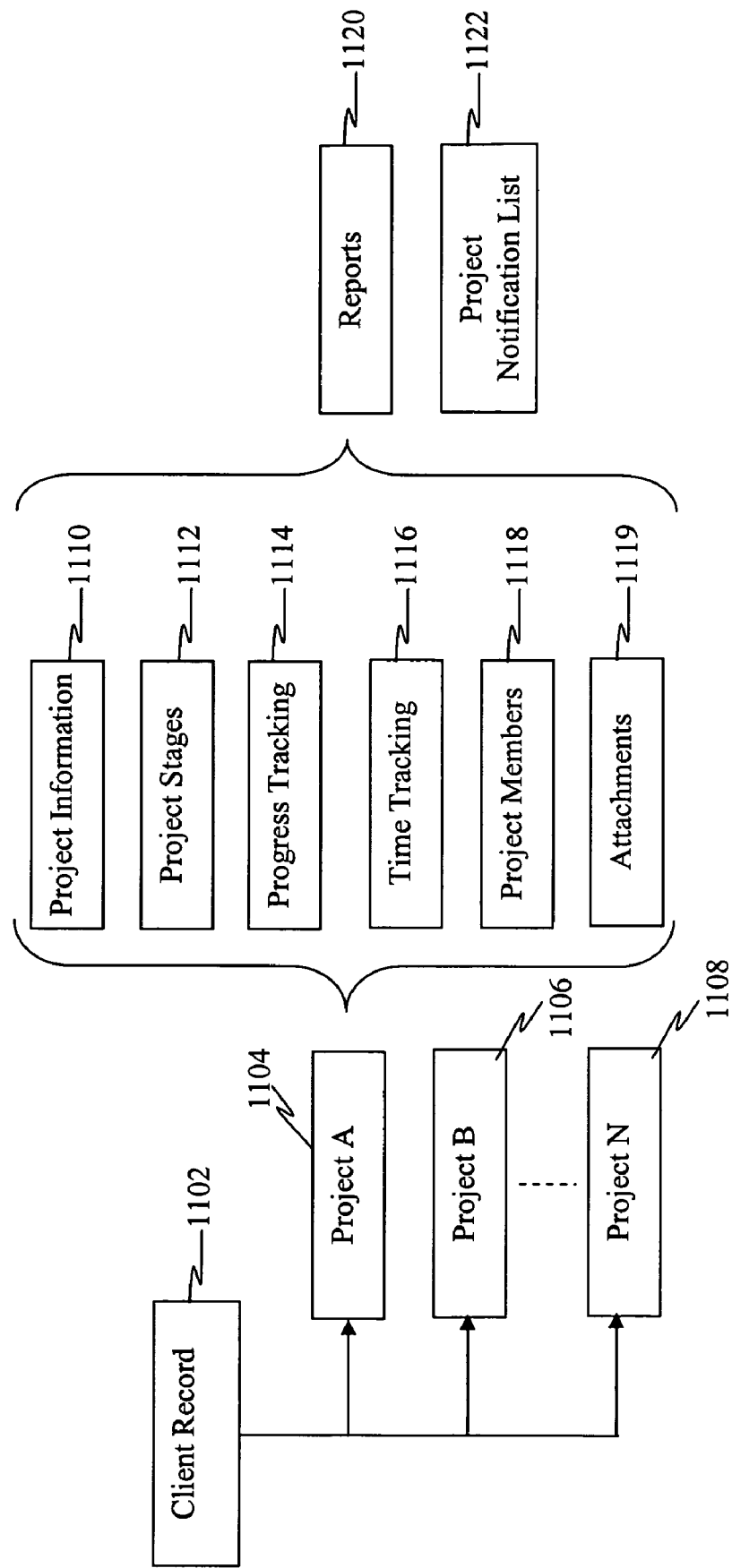
FIG. 11 illustrates another aspect of the invention where project tracking, progress tracking, and/or time tracking may be performed via the collaboration manager.

FIG. 11 illustrates another aspect of the invention where project tracking, progress tracking, and/or time tracking may be performed via the collaboration manager. In addition to the email logging features described above, a client record 1102 may also be associated with one or more projects 1104, 1106, and 1108. These may be projects which the user of the collaboration manager is doing for a client. Each project may be accessed directly via an application interface or via an email application. For each project, project information 1110, project stages 1112, progress tracking 1114, and/or time tracking 1116 may be maintained. These components or information may be accessed in a similar way than the email/note logs. That is, a particular email may be used by project members 1118 to log entries for each project or to receive information (via a recipient list) for a project. For example, progress reports 1120 may be submitted by a project member sending a progress report email to the collaboration manager using a project-specific email address or directly providing such report to the collaboration manager application via a web-based user interface. Similarly, a project member may submit project related attachments 1119 to the collaboration manager for access by other project members. In this manner, each member of the project can enter his/her time spent 1116, and/or progress details 1114 for the various stages 1112 of a project. Depending on the configuration for project reports 1120, notifications of the project stages 1112, completion estimates versus actual time spent, and/or progress notes may be sent (via email to a recipient list) or accesses by project members or supervisors via a web-based user interface. A project notification list 1122 may be used to define the people who should receive a notification or report. This system may also be employed by project members to track the time spent in each project, stage, and/or project-related task.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. An apparatus comprising:
 a communication interface to receive electronic messages; and
 a processing unit coupled to the communication interface, the processing unit configured to
 receive an electronic message intended for a first party,
 log a stripped version of the electronic message in a first record associated with the first party,
 strip any attachment from the electronic message, and separately store the attachment in a database and associate the attachment with the first record,
 monitor a subsequent change to the first record,
 maintain a monitor alert list associated with the first record that includes one or more users that are to be notified of the change in the first record, and
 notify the one or more users of the change in the first record by sending a notification message to the one or more users, wherein the notification message is a separate message from the electronic message.

2. The apparatus of claim 1 further comprising:
 a storage device to store records of electronic messages, and a database to store attachments received in electronic messages.

3. The apparatus of claim 1 wherein the processing unit is further configured to
monitor the intended recipient of received electronic messages,
determine if the intended recipient has an existing record,
retrieve the existing record and append the stripped version of the electronic message to the existing record if one exists, and
create a new record and add the stripped version of the electronic message to the existing record if one does not exists.

4. The apparatus of claim 1 wherein the stripped version of the electronic message is the text content of the electronic message.

5. The apparatus of claim 1 wherein processing unit is further configured to
check the database for a duplicate of the attachment, and
store the attachment only if a duplicate is not found.

6. The apparatus of claim 5 wherein if a duplicate of the attachment is found in the database, the duplicate attachment is associated with the first record.

7. The apparatus of claim 1 wherein the processing unit is further configured to
store multiple stripped versions of a plurality electronic messages for the first party in the first record.

8. The apparatus of claim 6 wherein the multiple stripped versions of the plurality electronic messages are appended as a single data element.

9. The apparatus of claim 1 wherein the communication interface receives the electronic messages from email applications operating on remote devices.

10. The apparatus of claim 1 wherein the processing unit is further configured to
permit a user access to the first record, access privileges of the user defining what information from the first record can be accessed.

11. The apparatus of claim 1 wherein electronic messages intended for different parties are logged in different records associated with each of the intended parties.

12. The apparatus of claim 1 wherein first record includes user-entered notes associated with the first party.

13. The apparatus of claim 1 wherein electronic messages stored in the first record are stored in a concatenated form.

14. The apparatus of claim 1, wherein logging of a stripped version of the electronic message is triggered as a result of addressing the electronic message to a centralized collaboration manager entity.

15. The apparatus of claim 14, wherein all logged electronic messages are subsequently accessible by a third party.

16. A method operational on a computer for aggregating and sharing electronic messages, comprising:
receiving electronic messages from one or more remote sources;
stripping a first electronic message of a header and a content;
storing the content in a first record associated with one or more intended receivers of the first electronic message;
monitoring a subsequent change to the first record;
maintaining a monitor alert list associated with the first record that includes one or more users that are to be notified of the change in the first record; and
notifying the one or more users of the change in the first record by sending a notification message to the one or more users, wherein the notification message is a separate message from the first electronic message.

17. The method of 16 further comprising:
stripping any attachment from the electronic message;
storing the attachment separately from the content; and
associating the attachment with the first record.

18. The method of claim 16 further comprising:
maintaining access control to the information users in the monitor alert notification list can access in the first record.

19. The method of claim 16 further comprising:
adding notes to a first record.

20. The method of claim 16 wherein the first record is a project record defining stages and members of a project.

21. The method of claim 20 wherein the electronic message is one of a project progress entry or a project time entry.

22. A system comprising:
one or more devices operating electronic mail applications, the electronic mail applications configurable to copy electronic messages to and from particular electronic addresses to a centralized collaboration server; and
the centralized collaboration server including a processing unit configured to
receive electronic messages from the one or more devices,
strip a first electronic message of a header and a content,
store the content in a first record associated with an electronic address of an intended receiver of the first electronic message,
strip any attachment from the first electronic message,
store the attachment separately from the content,
associate the attachment with the first record,
monitor a subsequent change to the first record,
maintain a monitor alert list of one or more users that should be notified of changes to the first record, and
notify the one or more users of the change in the first record by sending a notification message to the one or more users, wherein the notification message is a separate message from the first electronic message.

* * * * *